(12) United States Patent  
Anderson et al.

(10) Patent No.: US 8,388,302 B2
(45) Date of Patent: Mar. 5, 2013

(54) COUPLING TURBOCHARGERS FOR PASSIVE PRE-SWIRL COUNTER-ROTATION

(75) Inventors: William G. Anderson, White Lake, MI (US); Paul Anschel, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 687 days.

(21) Appl. No.: 12/550,551

(22) Filed: Aug. 31, 2009

(65) Prior Publication Data

US 2010/0061843 A1 Mar. 11, 2010

Related U.S. Application Data

(60) Provisional application No. 61/095,866, filed on Sep. 10, 2008.

(51) Int. Cl.
*F04D 1/10* (2006.01)

(52) U.S. Cl. .................... 415/60; 415/199.1; 415/206

(58) Field of Classification Search ............ 60/612; 123/562; 415/60, 62, 66, 63, 199.1, 206; 416/120, 123
See application file for complete search history.

(56) References Cited

U.S. PATENT DOCUMENTS

| 4,032,262 | A * | 6/1977 | Zehnder ................ 417/409 |
| 5,109,674 | A | 5/1992 | Sudmanns |
| 5,157,924 | A | 10/1992 | Sudmanns |
| 6,655,142 | B2 * | 12/2003 | Callas et al. ............ 60/614 |
| 6,994,518 | B2 * | 2/2006 | Simon et al. ............ 415/147 |
| 7,032,383 | B2 * | 4/2006 | Weber ................... 60/612 |
| 7,302,800 | B2 * | 12/2007 | Klingel ................. 60/612 |
| 7,600,380 | B2 * | 10/2009 | Grissom et al. ......... 60/612 |
| 2004/0096316 | A1 | 5/2004 | Simon et al. |
| 2006/0086090 | A1 | 4/2006 | Kilkenny |

FOREIGN PATENT DOCUMENTS

| DE | 4016776 A1 | 10/1991 |
| EP | 1749992 A1 | 2/2007 |
| GB | 2244094 A | 11/1991 |

* cited by examiner

*Primary Examiner* — Ninh H Nguyen
*Assistant Examiner* — Liam McDowell
(74) *Attorney, Agent, or Firm* — William G. Anderson; Stephan A. Pendorf; Patent Central LLC

(57) ABSTRACT

A turbocharger with a high pressure (HP) and low pressure (LP) stage, designed such that swirl in a conduit providing fluid communication between the LP compressor outlet and the HP compressor inlet is received by the second stage compressor counter to the direction of rotation of the second stage compressor wheel. This is achieved without requiring vanes such as inlet guide vanes, and thus is highly efficient as well as free of blockage and excitation.

9 Claims, 9 Drawing Sheets

COUPLING TURBOCHARGERS FOR PASSIVE PRE-SWIRL COUNTER-ROTATION

FIELD OF THE INVENTION

This invention relates to improving turbocharger useable map width without additional complexity in turbocharger design or cost in turbocharger manufacture. This is done by intentionally designing or orienting turbochargers in series such that the inherent airflow swirl in the fluid linkage between the low pressure compressor and the high pressure compressor is opposite to the direction of rotation of the compressor wheel in the high pressure compressor.

BACKGROUND OF THE INVENTION

The use of turbochargers has been wide spread, in the US, on production Diesel engines since 1954 and on gasoline engines since the 1960s. Turbochargers are used for several reasons, e.g., to increase power density and thus reduce the size of engines for a given power rating, which helps vehicle dynamics in terms of weight and reduced aerodynamic frontal area. Turbocharging is used by engine and vehicle manufacturers to meet mandated emissions by increasing engine combustion efficiency with the desirable reduction in CO, $CO_2$ and $NO_x$ emissions.

Where a normally aspirated engine loses the energy present in the exhaust, a turbocharged engine recovers this energy by using it to drive the turbine wheel of a turbocharger at very high RPM. The turbine wheel is mechanically connected to a compressor wheel (27), which is then driven to spin at the same RPM. Each stage, compressor and turbine, can be described as consisting of multiple components: inlet, shroud, impeller (or wheel), diffuser, volute, and outlet. The compressor wheel is mechanically connected to, and driven by, the turbine of the turbocharger. The compressor wheel, located within the compressor cover (2), draws air in axially, accelerates the air via the high rotational speed of the wheel, changing the direction of the air to a radial direction, and expelling the air radially with high kinetic energy in the form of high velocity into the diffuser section of the compressor stage. The function of the diffuser is to recover as much kinetic energy as possible by translating the high velocity of the air into pressure and temperature. The diffuser geometry is normally defined by the compressor backplate on one side and the diffuser geometry area of the compressor housing on the other side. The diffusion zone then feeds to the volute which collects the air from the diffuser. The function of the volute may be diffusing, constant velocity, or even accelerating, depending upon the design intent. The diffuser communicates with the compressor outlet.

Turbochargers are designed to operate at a particular target boost, and typically run into aerodynamic and material limitations when boost, or pressure ratio requirements, exceed certain levels. For example the natural, useable limit for single turbochargers is around 4.3 pressure ratio. To achieve greater boost, there are a number of options:

Where there is a material limitation, one option is to change the compressor impeller from aluminum to titanium, which raises both the temperature capability and low cycle fatigue (LCF) life of the compressor impeller.

Where the pressure ratio is not sufficient for the application, a method, employed in the industry, as depicted in FIG. 4, is to use vaned-diffusers (26) on the exit side of the compressor wheel (27). This has the negative effect of narrowing useable map width, combined with an elevation in temperature of the compressed air, the compressor wheel, and the vanes in the diffuser section. Exacerbation of both vane and impeller blade excitation, and thus high cycle fatigue (HCF) is a serious issue with the use of vaned-diffusers.

Another method commonly employed is a series compressor configuration. In this configuration, the discharge air from the first stage, or low pressure (LP), compressor is fed into the intake of the second stage, or high pressure (HP), compressor where the gases are once again compressed to produce higher pressure. In this configuration the air is often intercooled between stages for many reasons, some of which are to increase the air density, to improve the thermodynamics or to enable more cost effective materials to be used. The series configuration can take several forms. A regulated two stage turbocharger can have the compressor stages in a series configuration while the turbines are in either series, parallel, sequential, or regulated. The regulated configuration allows the turbines to be in either series or parallel configuration, depending on the position of a bypass valve.

Packaging of series or regulated turbochargers is especially difficult as the envelope used for the two turbos is usually expected to be that of a single turbo, in the already crowded under-hood environment. The turbine housings must be located in close proximity with each other as there are usually valves or bypasses controlling the turbine flow in both the specific turbocharger and its mate to influence turbine back pressures, flows, and compressor boost levels. Often in a regulated, or in a sequential, turbocharger configuration, there is one turbo with a small turbine housing and turbine wheel to provide good turbo response, and then a larger turbocharger, with large turbine housing and turbine wheel, to provide adequate boost to the high end of the operating range (high gas flow volumes). The compressors are generally in close proximity because the turbines are close to each other, and the compressor stages are mechanically connected to the turbine stages on each turbo. This close-coupling often causes problems with tight "U" bends of the compressor piping into the high pressure stage. Close coupling also exacerbates excitation of the downstream compressor blades. Any bypass or boost regulating valves have to also be incorporated into the package. Turbos in this configuration are usually stock turbos used in other applications to keep capital costs down and to minimize general part number count. With a prime rationale for turbocharging being to increase power density and thus reduce engine size, for improved vehicle aerodynamics, adding additional turbos is very challenging from a space perspective.

Turbochargers consist of a compressor wheel (or impeller) and housing, a turbine wheel and housing, and a bearing housing. These components, plus the thrust bearing, are configured for the turbocharger to operate in one direction of rotation only. To produce a turbocharger with an opposite direction of rotation, then each of these 6 components must be designed and manufactured specifically for the counter-rotation requirement and segregated from the remainder of production to prevent manufacturing and assembly errors. Considering also the need to remanufacture turbochargers at intervals, it is accepted practice within the business of turbocharger manufacture that it is more cost effective and more rational to have all turbocharger models rotate in the same direction. While directions of rotation will vary among different turbocharger manufacturers, they tend to keep to one rotation direction within their range of products.

Turbocharger performance is measured by several parameters including: (See FIG. 7 for a typical compressor map) Pressure ratio, Efficiency, and Map Width. These parameters are interlinked to a great extent so one parameter cannot be altered without affecting the other two.

Pressure ratio is the ratio of air pressure out of the compressor to the air pressure into the compressor ($P_2/P_3$), and is depicted on the Y-axis (55) of the map. For a compound or series turbo the total pressure ratio is the ratio of air pressure out of the high pressure turbo to the air pressure into the compressor of the low pressure turbo. The pressure ratio is depicted as the Y axis on a compressor map in FIG. 7.

The total-to-static (pressure) efficiency measurement of a compressor stage is the most representative method for representation of compressor efficiency. In its most simple form this is the ratio of the discharge pressure to inlet pressure, divided by the ratio of the discharge temperature to inlet temperature. The efficiency of the turbocharger is depicted on a compressor map as islands (74) of equal efficiency in the engine operating regimes of the map. Total-to-static efficiency is calculated by:

$$\eta = \frac{(P_2/P_{01})^{(k-1)/k} - 1}{(T_2/T_{01}) - 1}$$

where $P_2/P_{01}$ is a measure of the isentropic work available to the order of specific heat ratio, and $T_{02}/T_{01}$ is a measure of the actual work done.

The map width of a typical turbocharger is depicted as the left and right boundaries of the map. The left boundary is the surge line (71) in FIG. 7. This is a test-generated line. At each speed line (73), the surge point is detected, noted, then interpolated for the entire map. At the surge point (depicted in FIG. 7 as the point on each surge line where the constant speed line (73 intersects the surge line (71)) oscillatory flow behavior causes a flow blockage. In the surge condition the flow detaches from the suction surface of the blade causing instability in the flow, which oscillates as the flow attaches and detaches from the blade. The surge condition moves with installation conditions so it must be tested for each set of installation parameters. In the surge condition the turbo reacts violently and must be kept out of this operating regime.

The right boundary is the choke line (75) in FIG. 7. This line is generated by selecting a minimum value of efficiency (often 65%), on each speed line in the region where there is a steep drop in efficiency caused by the air flow reaching sonic velocity. In the choke regime, the turbo operates smoothly but the pressure ratio (depicted at the Y-axis (55)) and efficiency fall, and temperatures rise.

The compressor map useable operating conditions can be made wider by several methods:

Adding a compressor recirculation feature, in slots or holes in the area of the compressor intake, delays the onset of surge to move the surge line to the left by increasing the effective volume flow rate through the inducer of the wheel to prevent stall on the blade. This increased stability range comes at a small efficiency loss but usually at a total increase in map width. Adding a recirculation feature also tends to force the onset of surge to be more abrupt. A huge downside to the recirculation bleed solution is often a very strident, high pressure, high amplitude noise, at the frequency of the number of full blades multiplied by the turbo speed in RPM (for a 7 full-bladed compressor wheel this frequency is 7N), 13 KHz for example. This problem often is resolved by solutions more complex than the execution of the recirculation flow strategy. U.S. Pat. No. 5,399,064 (Church et al) utilizes a type of muffler inserted into the recirculation cavity. Another patent, U.S. Pat. No. 6,623,239 (Sahay) utilizes a reflective cone to prevent the strident frequency from being transmitted through the inlet ducting.

Variable inlet guide vanes (IGVs) are used at the compressor inlet to change the angle at which the incoming air impinges on the rotating compressor impeller. In FIG. 8 the airflow (1) into the compressor is turned by the IGVs (81) housed in the compressor cover inlet such that the vectors of the inlet flow are changed to impart general rotation within the compressor cover, and thus the compressor wheel sees this rotation at its inlet. See U.S. Pat. No. 6,994,518 (Simon), U.S. Pat. No. 3,922,108 (Benisek), and U.S. Pat. No. 7,083,379 (Nikpour). These vanes can be manipulated to induce swirl in the incoming air such that it impinges on the rotating compressor wheel at an angle, either pro-rotation, or counter rotation. Using this technique, the useable regime in the operating envelope of the turbocharger map can be made to move to the left, or right of the static map. When the IGVs provide inlet swirl, counter to the direction of rotation of the compressor impeller, the entire surge line moves to the right, with a small movement of choke flow to the left, and an increase in pressure ratio. This decreases surge margin but results in the peak efficiency islands moving to higher mass flows or to the right on the compressor map. By being able to rotate the IGVs to produce flow the other direction (in the direction of rotation) surge margin is gained, a slight reduction (over the benchmark) in choke flow is seen, and pressure ratio is reduced as the amount of work done by the compressor decreases. A technical shortcoming of IGVs or pre-swirl vanes is that, in order to maximize flow for a compressor wheel, the compressor wheel blades are made as thin as possible, which makes them susceptible to high cycle fatigue (HCF) problems. A structure or blockage placed in front of the compressor wheel and inlet exacerbates any blade frequency condition which may be present with the result that much qualification work must be done to ensure that inlet guide vanes do not cause any increase in excitation of the compressor wheel blades. These excitations usually lead to compressor wheel HCF blade failures. Of course the same problems—blockage and excitation—which afflict compressor wheel blades also afflict the inlet guide vanes. Individual inlet guide vanes are themselves very expensive to manufacture because the "blockage" and "excitation" rationales force them to be quite elegant. Adjustable inlet guide vanes become very expensive as the controlling and operating mechanisms (82) must also be quite elegant and compact to meet the above criteria.

SUMMARY OF THE INVENTION

It was always assumed that, once air has traveled axially into the compressor inlet, been expelled from the compressor wheel with a combination of tangential and radial velocity, driven through the diffuser to be converted from velocity to pressure, been collected at all points around the volute and fed to the compressor discharge, this air moves as a mass, predominantly parallel to the direction of centerline of the compressor discharge.

During an emissions reduction experiment to check for any oil passage out of a compressor stage, a clear plastic tube was used to witness the onset of oil passage. The inventors were surprised to see that, when there was oil present, the oil stream was describing a spiral in this experimental transparent compressor discharge. This was a surprise. In fact, in a patent application recently filed by the assignee of the present application including one of the present named inventors (U.S. Provisional Application 60/981,271 Roby et al), the prior art cited therein and the compact inlet design illustrated in the application showed parallel flow with no rotation component.

The oil flow spiral indicated that there was some remaining tangential velocity to the airflow (known as "swirl"). The inventors surmised that this was due, in part, to the geometric method of rolling the volute around the diffuser plane, to reduce the compressor housing envelope for space constraints on vehicles, and in part to the direction of rotation of the compressor wheel.

After witnessing this phenomenon the inventors first considered that it might be necessary to install some means such as vanes in the conduit to counteract this swirl. The inventors then hypothesized that it might actually be possible to take advantage of this inherent swirl to address the above discussed problem of improving turbocharger efficiency. The inventors hypothesized that, in the situation in which an engine is fed by two turbochargers with the compressor stages in series, the LP stage compressor, which precedes the second stage HP turbocharger compressor in the installation, is selected such that the output of the compressor stage produces a swirl, which rotates in a direction, counter to that of the second stage HP compressor. By selecting or designing the first stage LP compressor such that the compressor discharge gas swirl direction, as the gas arrives at the second stage, HP compressor, is in a direction opposite to the direction of rotation of the high pressure turbocharger compressor, the direction of rotation of the exit swirl of the LP compressor will move the HP compressor efficiency islands to the right, or higher mass flow region, of the map. This is where the HP compressor is working at higher engine speeds, and the HP compressor is likely to have its performance degraded by pro-rotation, so the result is improved efficiency for the total turbocharger assembly.

Following testing, it was determined that this idea did in fact result in a tangible improvement in efficiency on the compressor map at the engine operating points. The benefit of this method was immediately recognized in that, other than requiring selection and staging of turbochargers based on direction of rotation, it did not require additional components such as inlet guide vanes, thus the turbocharger assembly remained economical and compact.

BRIEF DESCRIPTION OF THE DRAWINGS

In the following the invention will be described by reference to prior art turbochargers and illustrative embodiments of the invention illustrated in the figures, wherein.

DETAILED DESCRIPTION OF THE INVENTION

The passage of air through the diffuser and around into the volute generates some rotation of the diffused air. This rotation is maintained through the expansion in the volute and the discharge pipe of the compressor cover. The rotation of this air is measured as a loss in efficiency for the compressor stage. If there was zero rotation, then the measured efficiency would be higher, but there is always some rotation and its associated losses.

Figure 1:
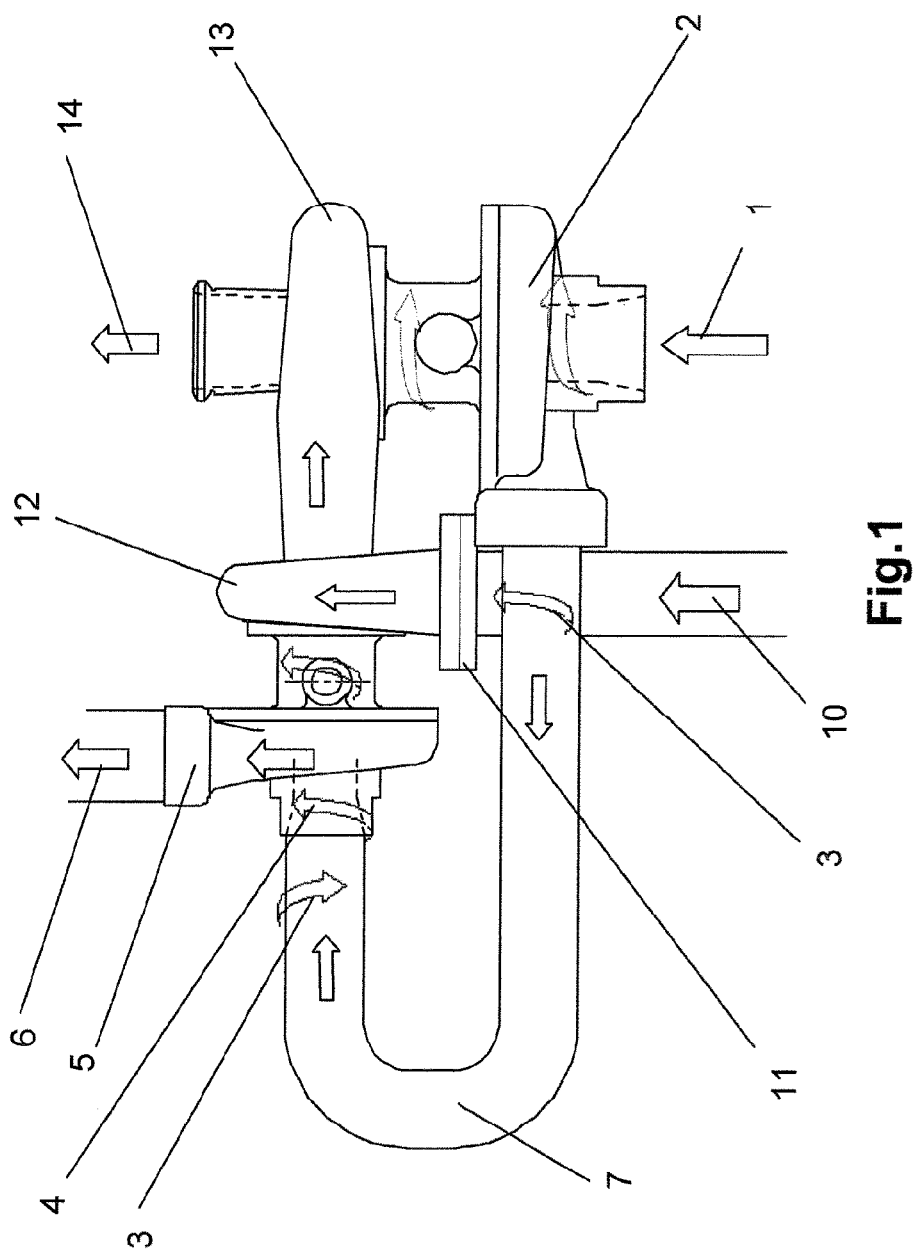
FIG. 1 is a plan view of a typical regulated two stage turbocharger with the HP turbo turning with a direction of rotation opposite to that of the LP turbo.

In FIG. 1, a two stage turbocharger application has a first turbine stage (12) and a second turbine stage (13). Exhaust gas flow (10) from the engine enters the high pressure (HP) turbine stage (12) through the foot (11) and ultimately exits through the exducer of the low pressure (LP) turbine stage (13) as flow (14) with heat energy in the exhaust flow being converted into energy to drive both turbine wheels. The geometry of the turbine housing volute and wheel extracts energy from the exhaust flow. The turbocharger also has a low pressure (LP) compressor stage (2) and a high pressure (HP) stage (5). The HP compressor and HP turbine are mechanically linked by a shaft, through which the turbine wheel drives the compressor impeller. Similarly, the LP stage compressor is mechanically linked to the LP stage turbine wheel by a shaft, through which the turbine wheel drives the compressor impeller. Air flow (1) from a filter, is sucked into the LP compressor (2), compressed and delivered by the duct (7) to the HP stage compressor (5) where it is where it is re-compressed then discharged by the HP stage compressor (5) as flow (6), which is compressed and at elevated temperature which is then delivered, via intercooler to the engine. The LP compressor (2) in FIG. 1 rotates in a clockwise direction, looking into the compressor, and produces compressed air which is discharged from the compressor stage through a duct (7) which fluidly connects the discharge of the LP compressor (2) and the HP compressor (5). The air discharged from the LP compressor (2) has a swirl component (3) to it, swirl being some tangential velocity, the direction of which is indicated by the arrow (3). This direction is determined by both the design of the compressor stage, in particular the direction of the diffuser and volute in the compressor housing, and the direction of rotation of the compressor wheel and cover. This swirl is seen at the inlet to the HP compressor (5) as in the clockwise direction (3), when facing the compressor inlet. The compressor wheel in the HP compressor stage (5) is rotating in a counter-clockwise (4) direction. The direction of swirl seen at the inlet to the HP compressor (5) is in a direction (3) counter to the direction of rotation (4) of the HP compressor wheel. This is referred to as counter-rotation.

Figure 2:
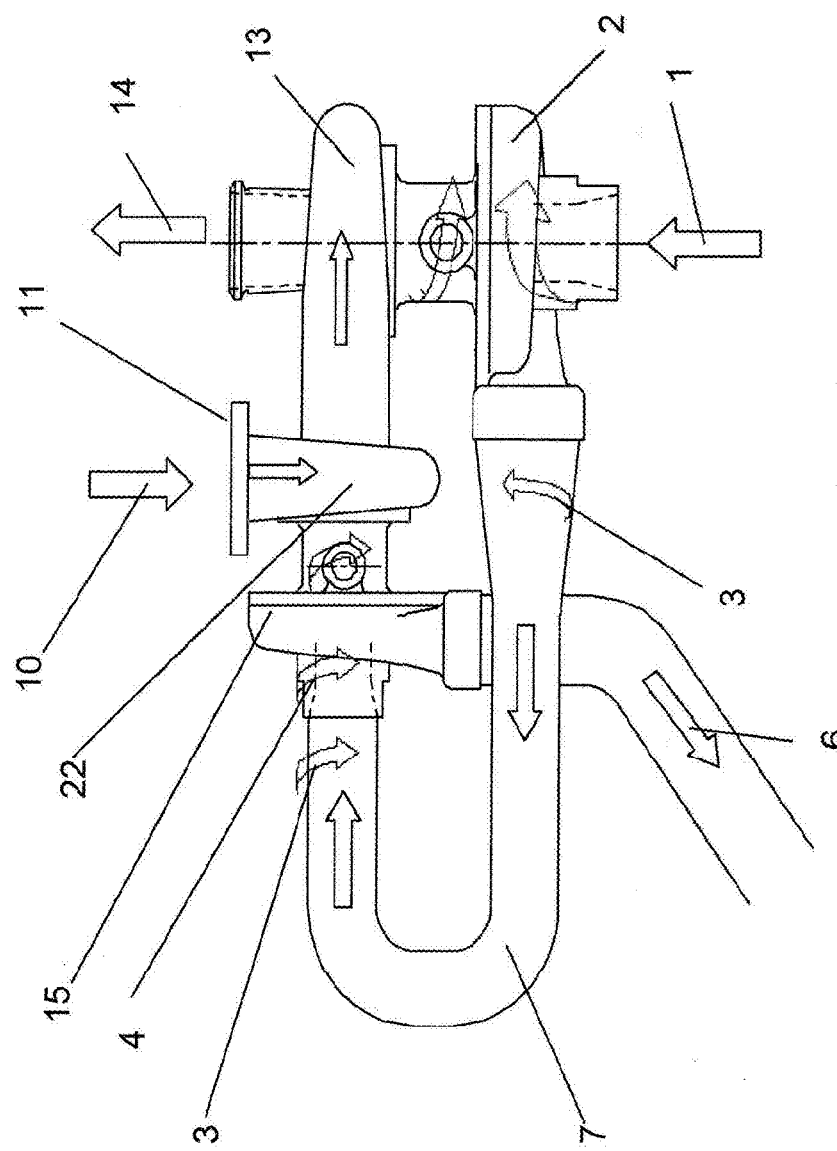
FIG. 2, is basically the same layout as in FIG. 1 but with the HP turbo turning with a direction of rotation, the same as that of the LP turbo.

Referring to FIG. 2, a two stage turbocharger application has a HP stage turbine (11) and a LP stage turbine (13). The turbocharger also has a LP stage compressor (2) and a HP stage compressor (15). The LP compressor and LP turbine are mechanically linked by a shaft, through which the turbine wheel drives the compressor impeller. Similarly the HP stage compressor is mechanically linked by a shaft through which the HP stage turbine wheel drives the compressor impeller. Air flow (1) from a filter, is sucked into the LP stage compressor (2), compressed and delivered by the duct (7) to the HP stage compressor (5) where it is re-compressed then discharged by the HP stage compressor (5) as flow (6) which is compressed, at elevated temperature which is then delivered, via intercooler to the engine. The LP compressor stage (2) rotates in a clockwise direction, looking into the compressor, and produces compressed air which is discharged from the compressor stage through a duct (7) which fluidly connects the discharge of the LP compressor (2) and the HP compressor (15). The air discharged from the LP compressor (2) has a swirl component (3) to it, swirl being tangential velocity, the direction of which is indicated by the arrow (3). This direction is determined by both the design of the diffuser and volute in the compressor stage, and the direction of rotation of the compressor wheel and cover. This swirl is seen at the inlet to the HP stage compressor (15) as in the clockwise direction (3), when facing the compressor inlet. The HP stage turbine (22) is driven by exhaust flow (10) from the engine exhaust manifold, which enters the HP turbine stage (22) through the foot (11) and ultimately exits through the exducer of the LP turbine stage (13) as flow (14) with heat energy in the exhaust flow being converted into energy to drive both turbine wheels The geometry of the turbine housing volute and wheel extracts energy from the exhaust flow, which causes the turbine wheel to rotate in the clockwise direction (4). Thus the HP stage compressor wheel, from the HP stage compressor (15), since it is mechanically connected to the HP stage turbine wheel, in the HP stage turbine (22) turns in the same clockwise direction (4) when facing the compressor inlet. The direction of swirl seen at the inlet to the HP stage compressor (3) is in a direction the same as the direction of rotation (4) of the HP compressor wheel. This is referred to as pro-rotation. Pro-rotation results from the standard orientation of series turbocharger compressor configurations today.

Figure 3:
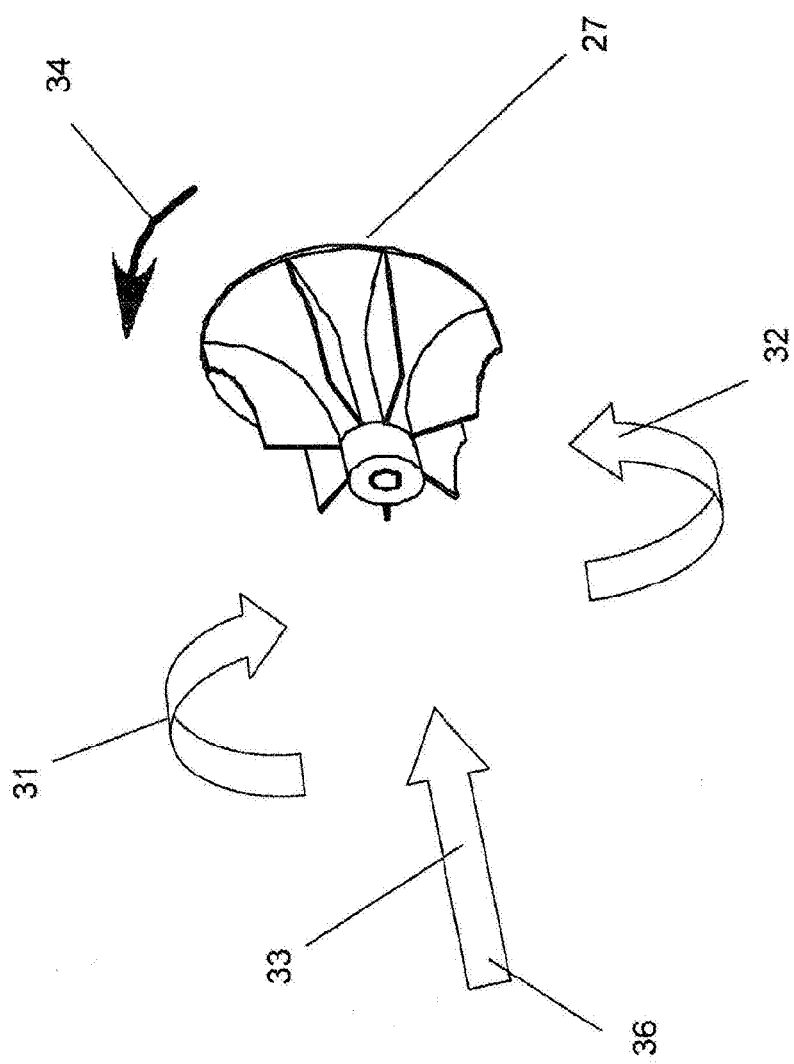
FIG. 3 is a sketch showing how the guide vane can change the direction of the vector triangle of inlet swirl to the compressor impeller.
Figure 4:
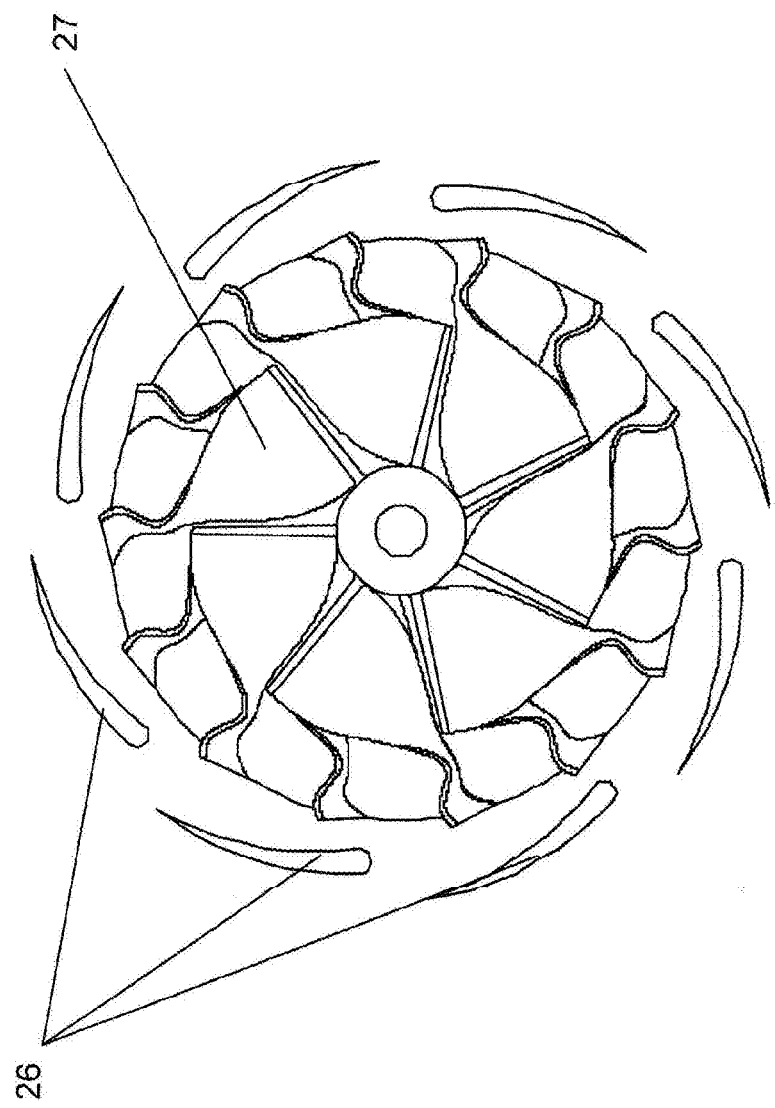
FIG. 4 is a sketch showing the relationship of the vanes to the compressor impeller in a vaned-diffuser arrangement.

Referring to FIG. 3, the compressor impeller is rotating, for the benefit of this explanation, in a counter-clockwise rotation (34). The incoming air to the compressor wheel (or impeller) (27), in general, is ducted to the compressor in the general direction (36) along the compressor wheel axis of rotation. This direction can be vectored to approach the impeller in a manner, depicted in the direction of rotation (32) (pro-rotation) of the impeller, or counter to the direction of the impeller (31) (counter-rotation). The direction, with zero rotation, is also noted (33).

Figure 7:
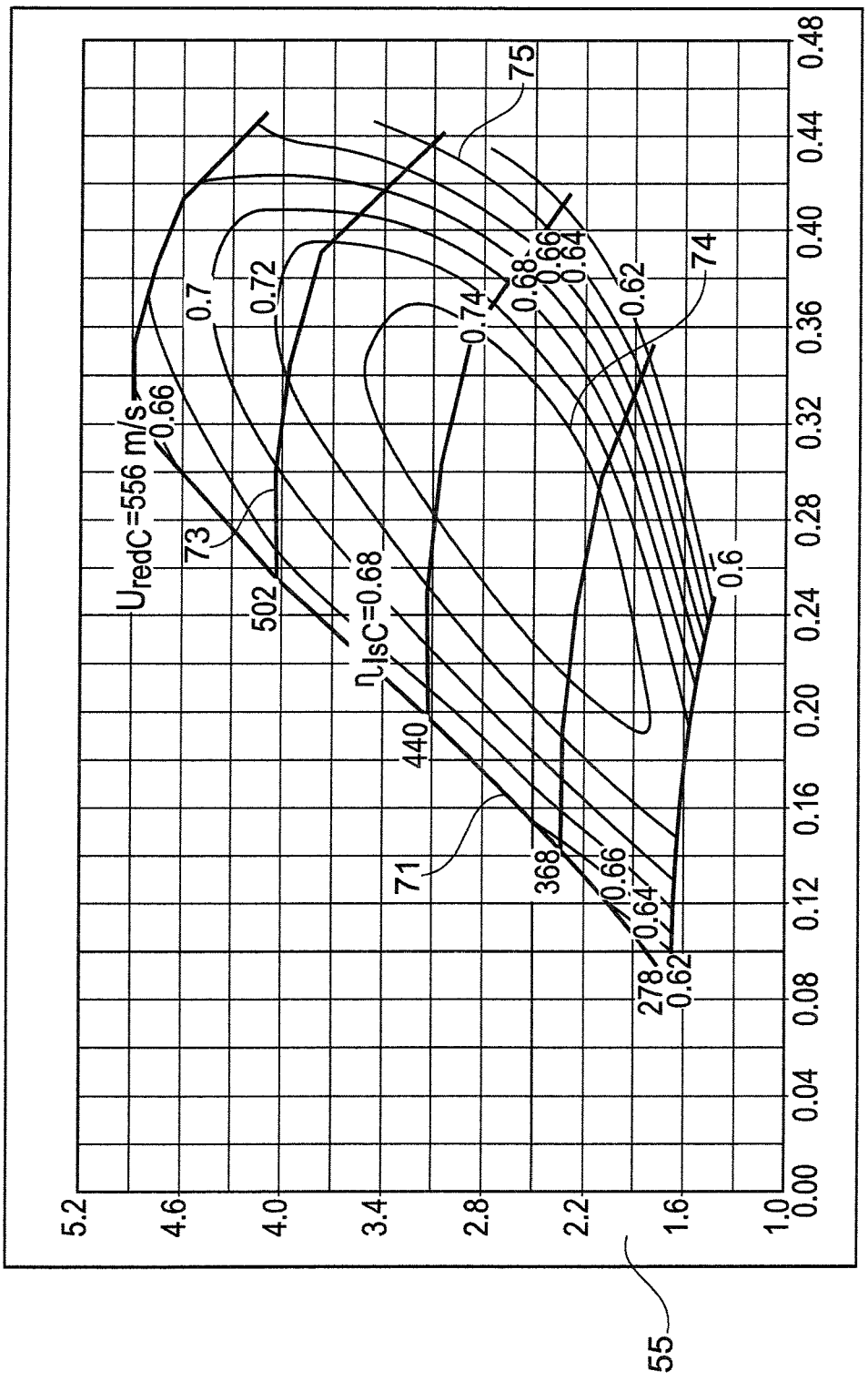
FIG. 7 is a simplified compressor map.
Figure 8:
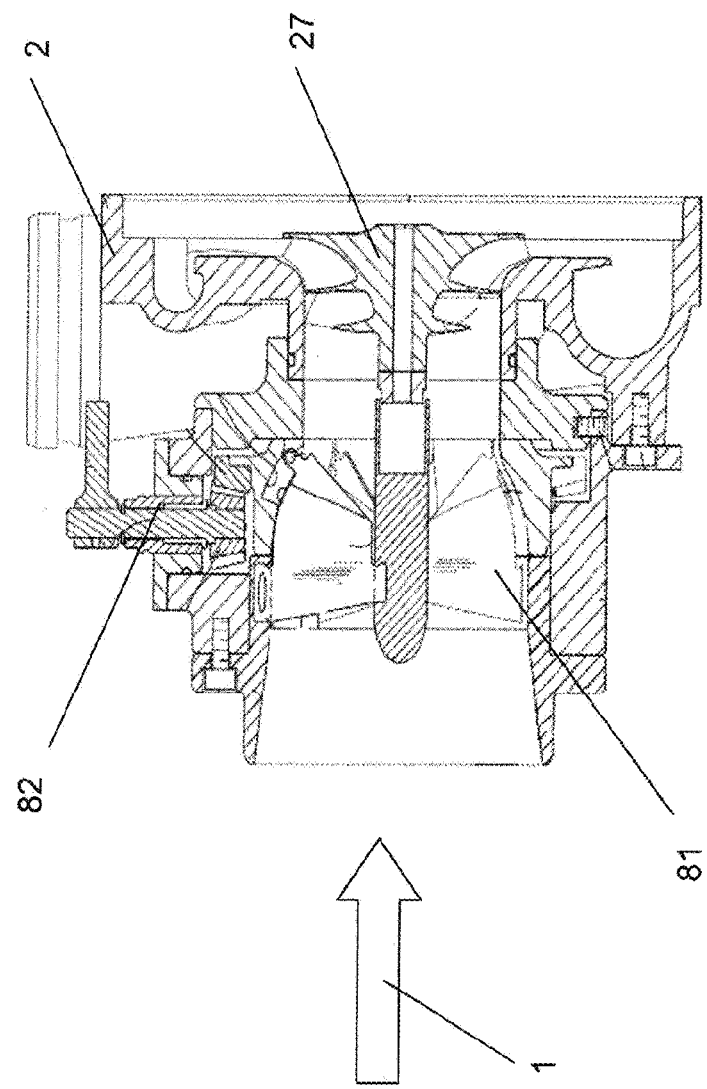
FIG. 8 is a sketch of an inlet guide vane configuration.
Figure 9:
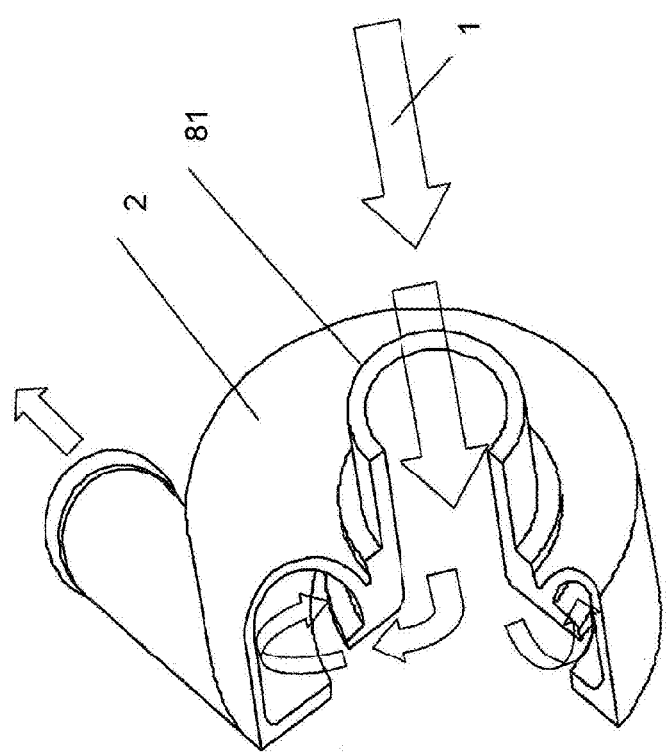
FIG. 9 illustrates the geometric method of rolling the volute around the diffuser plane in a compact compressor housing.

FIG. 7 represents a typical compressor map. The Y axis (55) represents the compressor stage pressure ratio developed. The X-axis (56) represents the compressor stage compressor flow. The nearly horizontal lines, for example (73), are lines of equal turbocharger speed. The choke boundary (75) of the map is generated by selecting a value of efficiency (often 65%) from each speed line in the region where there is a steep drop in efficiency caused by the air flow reaching sonic velocity. This is an arbitrary value but is usually consistent across all of a turbocharger manufacturers maps. The left boundary (71) is the surge line. This is a test-generated line. At each speed line, the surge point is detected, noted, and then interpolated for the entire map. At the surge point, oscillatory flow behavior causes a flow blockage. In the surge condition the flow detaches from the suction surface of the blade causing instability in the flow, which oscillates as the flow attaches and detaches from the blade.

Figure 5:
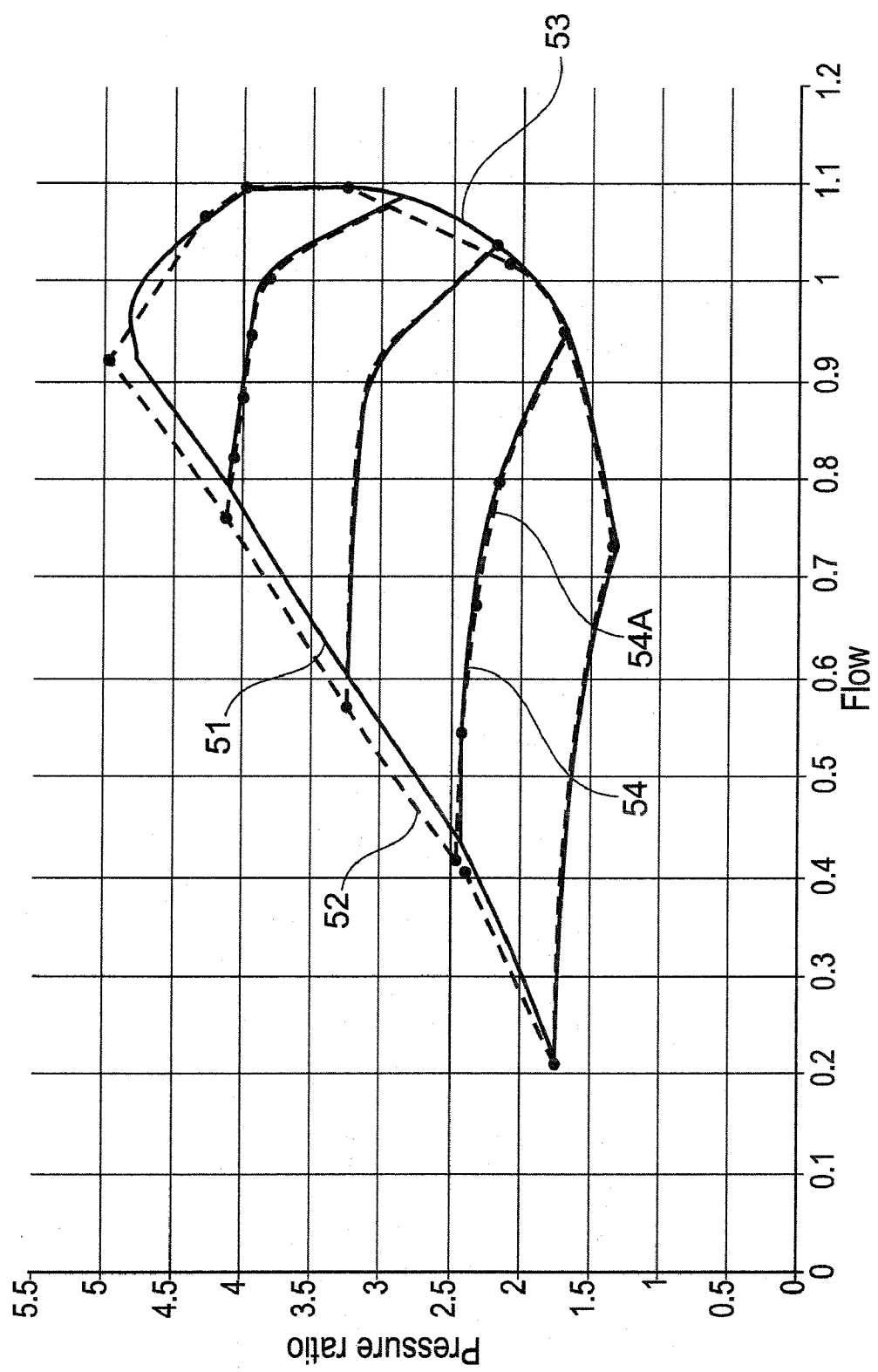
FIG. 5 is a compressor map, for pro-rotation, with the surge line moved to the left.

FIG. 5 depicts a compressor map. When the incoming flow is pro-rotation, the surge line (51) moves to the left of the map (52), the pressure ratios (54, 54A) stay about the same and the choke line (53) moves also to the left, but less than the distance the surge line moves.

Figure 6:
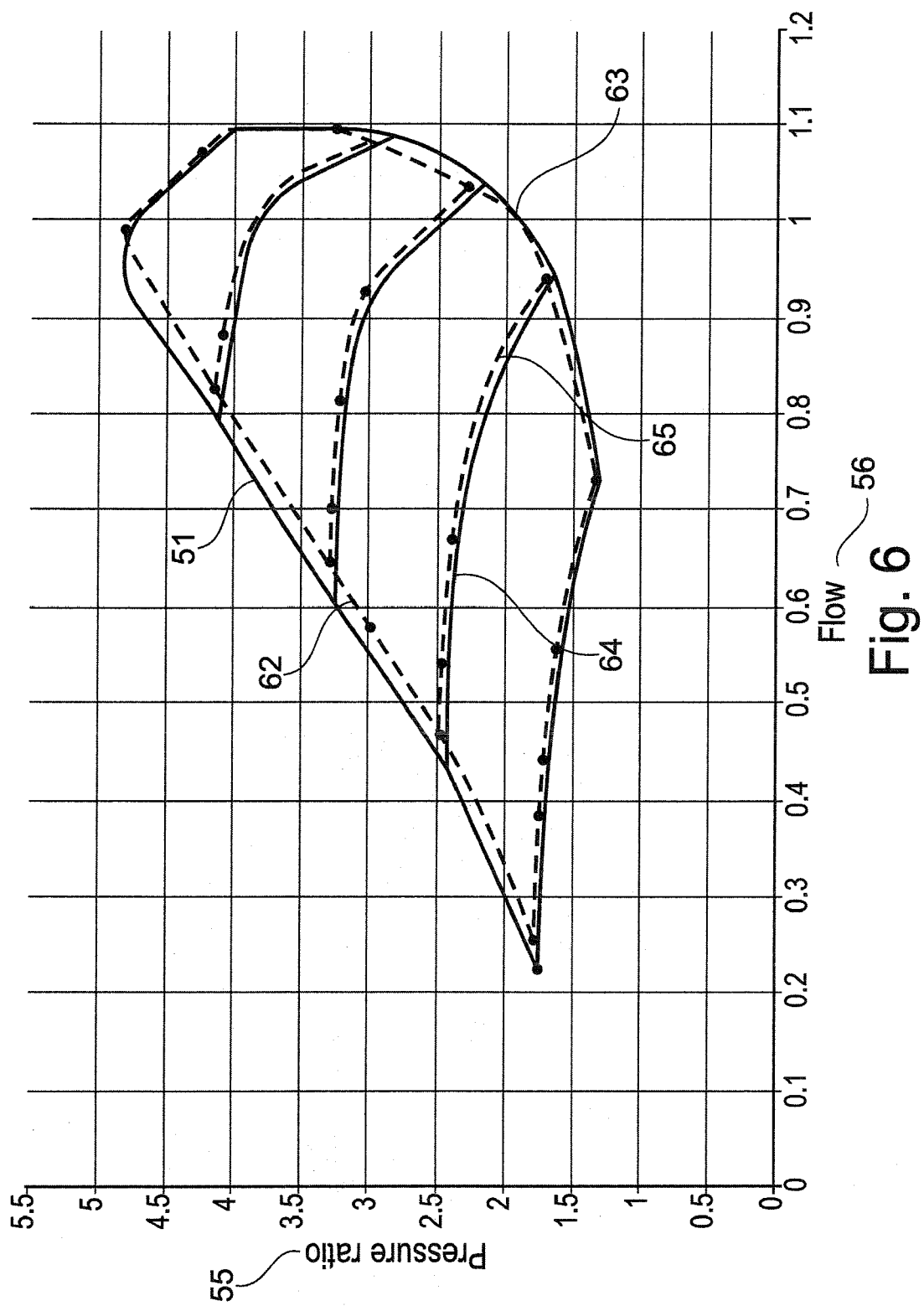
FIG. 6 is a compressor map, for counter-rotation, with the surge line moved to the right.

In FIG. 6, when the incoming flow is counter rotation, the surge line (51) moves a little to the right of the map (62), the pressure ratio increases, as can be seen by the constant speed line (64) moving to a higher position (65), and the choke line (63) pretty much stays fixed. The efficiency islands move with the surge line so the peak efficiency island moves to the region of the map where the engine is running.

Since space is always critical for turbochargers, in the under-hood environment, and even more critical when there are two turbochargers, such as in a series or regulated two stage application, the inventors decided to see if they could take advantage of this discovery. By noting the direction of rotation of the low pressure turbocharger compressor, and selecting or manufacturing a high pressure turbocharger compressor with rotation in a counter direction (to the low pressure compressor), both the mass flow is increased for a given pressure ratio and turbo speed, the efficiency islands move to a more helpful part of the map, so the overall turbo assembly efficiency is improved, with no additional hardware count.

The present disclosure contemplates the turbochargers being of any number of stages where each stage imparts a complementary swirl rotation on the compressor of the next downstream stage, such as by rotation of each of the next stages in series in an alternating direction.

We claim:

1. A turbocharger assembly comprising:
   a. a low pressure (LP) turbocharger stage comprising a LP compressor (2) and a LP turbine (13) mechanically connected to the LP compressor;
   b. a high pressure (HP) turbocharger stage comprising a HP compressor (5) and a HP turbine (12) mechanically connected to the HP compressor;
   c. said LP compressor having a radial outlet and said HP compressor having an axial inlet and a compressor wheel adapted for being driven in a first direction of rotation,
   d. a conduit (7) providing fluid communication between the LP compressor outlet and the HP compressor inlet, wherein said LP turbocharger compressor has a volute shaped to produce a swirl in the airflow output from the LP compressor, the swirl having a direction of rotation that is opposite to the first direction of rotation of the compressor wheel of the HP compressor, wherein the swirl is propagated along the conduit such that the swirl arrives at the HP turbocharger compressor inlet in a direction of rotation that is opposite to the first direction of rotation of the compressor wheel of the HP compressor.

2. The turbocharger assembly as in claim 1, wherein said conduit has a substantially constant cross section along it's length.

3. The turbocharger assembly as in claim 1, wherein said conduit is free of any internal vanes or blades.

4. The turbocharger assembly as in claim 1, wherein said HP compressor has no variable inlet guide vanes.

5. The turbocharger assembly as in claim 1, wherein said HP compressor has variable inlet guide vanes at the compressor inlet adapted to change the angle at which the incoming air impinges on the rotating compressor impeller.

6. The turbocharger assembly as in claim 1, wherein said LP and HP turbochargers are arranged in series.

7. The turbocharger assembly as in claim 1, wherein said LP and HP turbochargers are in a regulated two stage arrangement.

8. A method for imparting pre-swirl to the inlet of a high pressure compressor of a two-stage compressor assembly comprising a low pressure (LP) compressor with a LP compressor wheel and a housing, and a high pressure (HP) compressor with an axial inlet, a HP compressor wheel and a housing, said method comprising:
   determining the direction of rotation of the HP compressor wheel,
   designing the housing of the LP compressor, including rolling the volute around the diffuser plane such that the output of the compressor stage produces a swirl in a direction that is counter to the direction of rotation of the HP compressor wheel, coupling the LP compressor outlet to the HP compressor axial inlet such that said swirl produced in said LP compressor reaches said HP axial compressor inlet,
wherein the direction of rotation of the swirl leaving the LP compressor is in a direction that is counter to the direction of rotation of the compressor wheel of the HP compressor and, wherein the direction of rotation of the swirl reaching the HP compressor inlet is in a direction that is counter to the direction of rotation of the compressor wheel of the HP compressor.

9. The method as in claim 8, wherein said LP and HP compressors are associated with LP and HP turbines, respectively, of a two stage turbocharger assembly.

* * * * *